United States Patent [19]

Olgac

[11] Patent Number: 5,505,282

[45] Date of Patent: Apr. 9, 1996

[54] SINGLE MASS DUAL FREQUENCY FIXED DELAYED RESONATOR

[75] Inventor: Nejat Olgac, Willimantic, Conn.

[73] Assignee: The University of Connecticut, Storrs, Conn.

[21] Appl. No.: 301,341

[22] Filed: Sep. 6, 1994

[51] Int. Cl.[6] .................................. F16F 7/00; F16M 5/00
[52] U.S. Cl. ...................... 188/379; 267/140.15; 248/550
[58] Field of Search .......................... 267/140.11, 140.13, 267/140.14, 140.15, 136; 188/379; 248/550, 575, 563, 566, 638

[56] References Cited

U.S. PATENT DOCUMENTS

| | | | |
|---|---|---|---|
| 989,958 | 4/1911 | Frahm . | |
| 3,701,499 | 10/1992 | Schubert et al. | 244/17.27 |
| 5,067,684 | 11/1991 | Garnjost | 248/550 |
| 5,170,103 | 12/1992 | Rouch et al. | 318/128 |
| 5,174,552 | 12/1992 | Hodgson et al. | 267/140.11 |
| 5,219,143 | 6/1993 | Staple et al. | 248/550 |

OTHER PUBLICATIONS

Nejat Olgac, D. Michael McFarland, Brian Holm–Hansen "Position Feedback–Induced Resonance: the Dalayed Resonator" DSC—vol. 38, Active Control of Noise and Vibration—ASME 1992, pp. 113–119.

N. Olgac and B. T. Holm–Hansen "A Novel Active Vibration Absorption Technique: Delayed Resonator" Journal of Sound and Vibration (1994) 1–12.

*Primary Examiner*—Robert J. Oberleitner
*Assistant Examiner*—C. T. Bartz

[57] ABSTRACT

Vibrations in a structure having a large mass and a multiplicity of frequencies of excitation are damped by determining two principal frequencies of excitation for the structure and coupling thereto a damping member of smaller mass to produce an absorber. The spring damper characteristics of the absorber are determined at these frequencies and the displacement of the damping member is monitored. The monitored displacement of the damping member is processed together with the spring damper characteristics of the absorber to output a signal which produces a force acting on the damping member proportional to the displacement of the damping member with a controlled time delay. This produces two frequencies of vibration in the damping member substantially equal to the determined frequencies of excitation of the large structure and thereby produces resonance of the damping member substantially at the determined frequencies of excitation. The resonance is effective to damp substantially the vibrations of the large structure at the determined frequencies of excitation.

11 Claims, 9 Drawing Sheets

(C)

ROOT LOCUS PLOT FOR VARYING GAIN AND CONSTANT DELAY
(ARROWS SHOW DIRECTION OF INCREASING GAIN)

GAIN VARIATION WITH THE CROSSING FREQUENCY $(\omega_{c1}, \omega_{c3}), (\omega'_{c1}, \omega'_{c3}), (\omega''_{c1}, \omega''_{c3})$ CORRESPOND TO $\tau_0, \tau_0 + \Delta\tau_0, \tau_0 - \Delta\tau_0$, RESPECTIVELY.

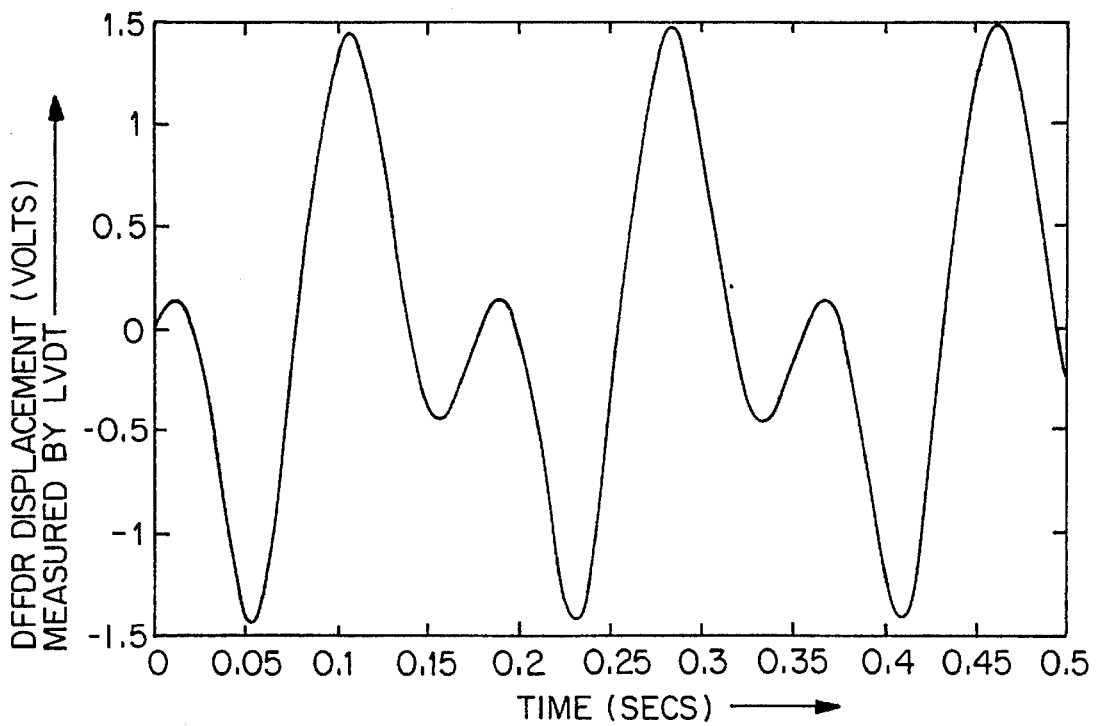
FIG. 7a SIGNAL ANALYZER TRACE OF A DFFDR, NATURAL RESPONSE TO AN IMPULSE DISTURBANCE
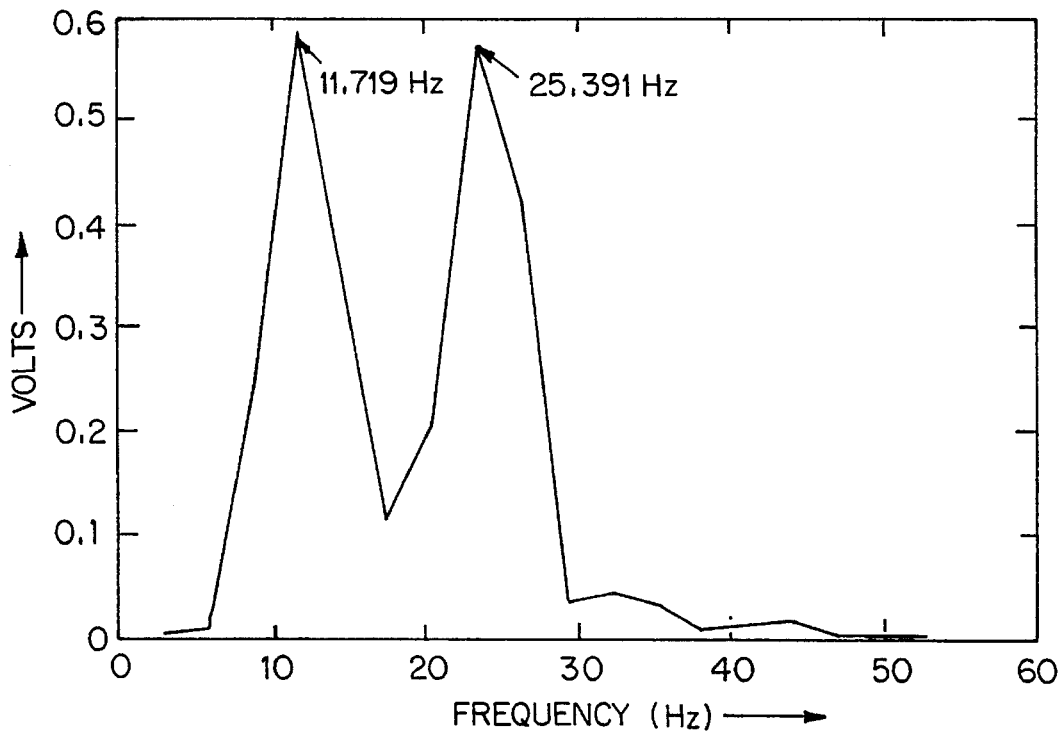
FIG. 7b FREQUENCY SPECTRUM OF THE RESPONSE IN FIG. 7A

FIG. 8a IMPULSE RESPONSE OF A DFFDR TO AN INITIAL AMPLITUDE OF 0.01M
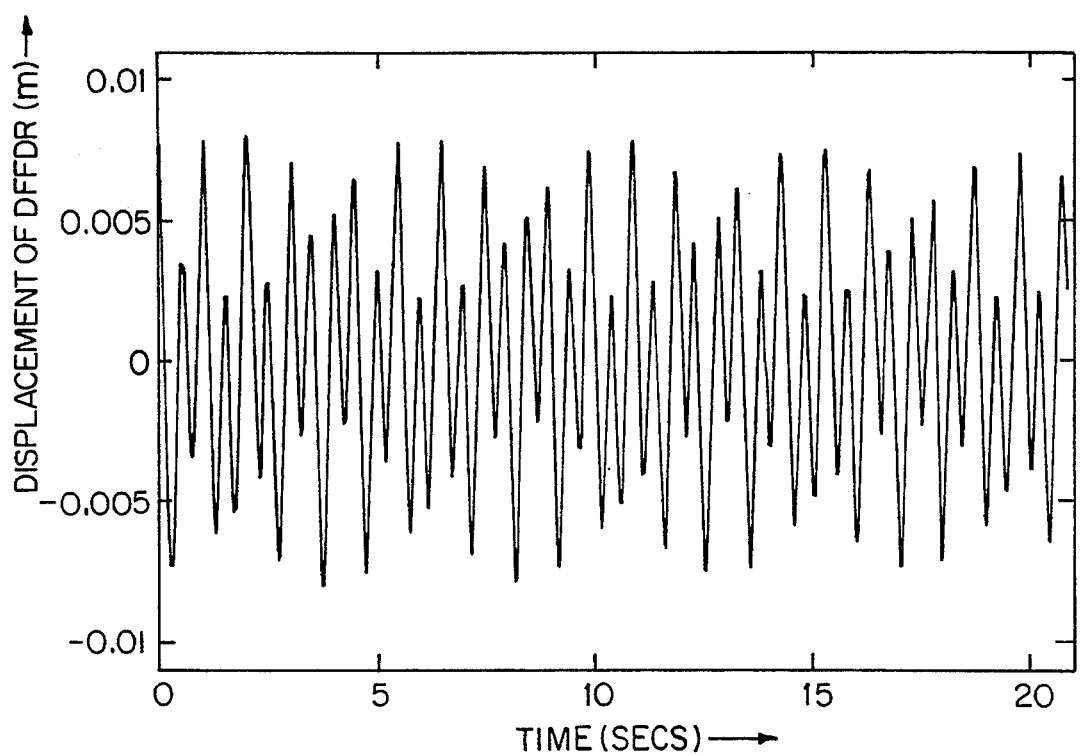
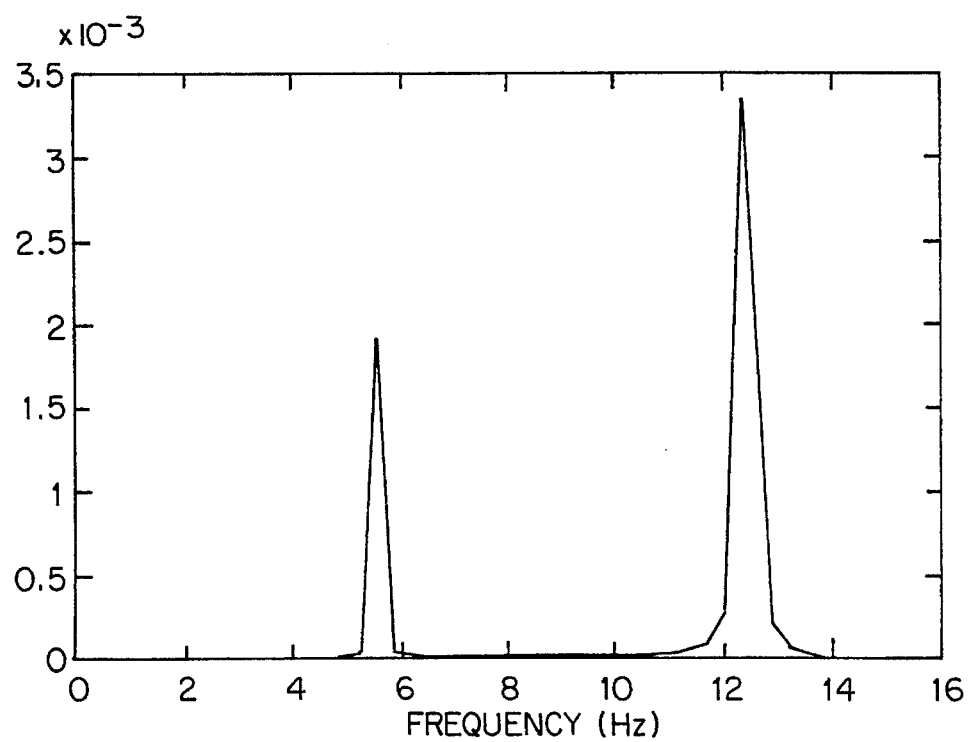
FIG. 8b FREQUENCY SPECTRUM OF THE RESPONSE IN FIG. 8A

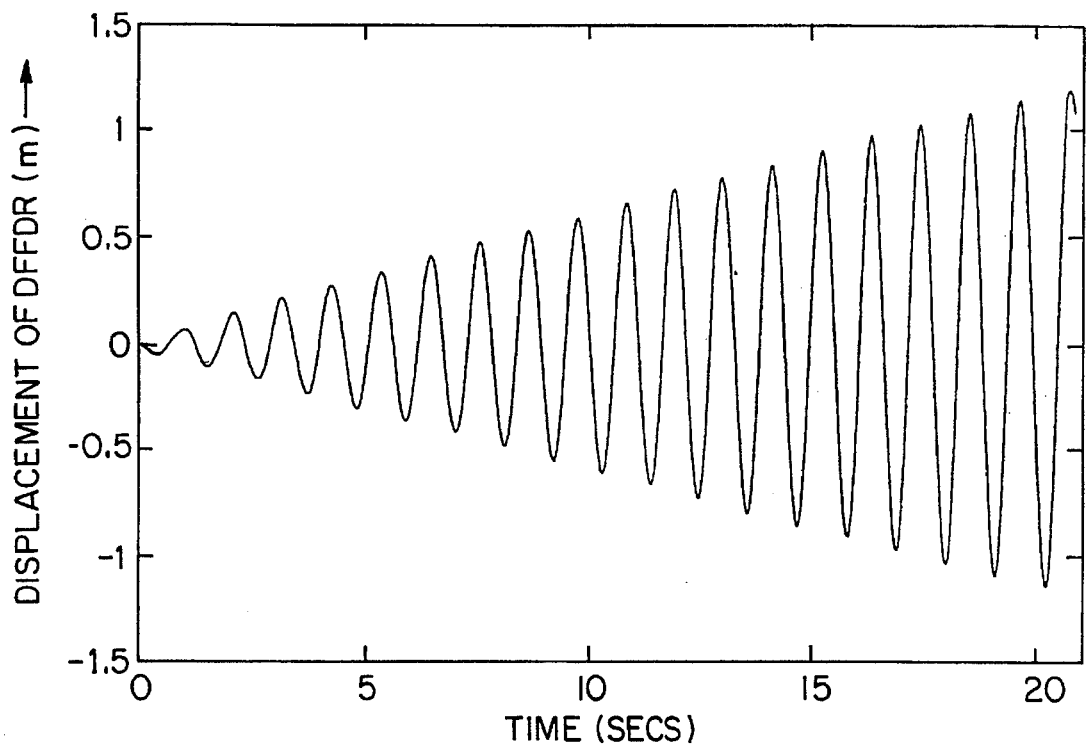
FIG. 9a THE RESPONSE OF THE DFFDR (OF FIG. 8A) TO SIN(5.7041τ)
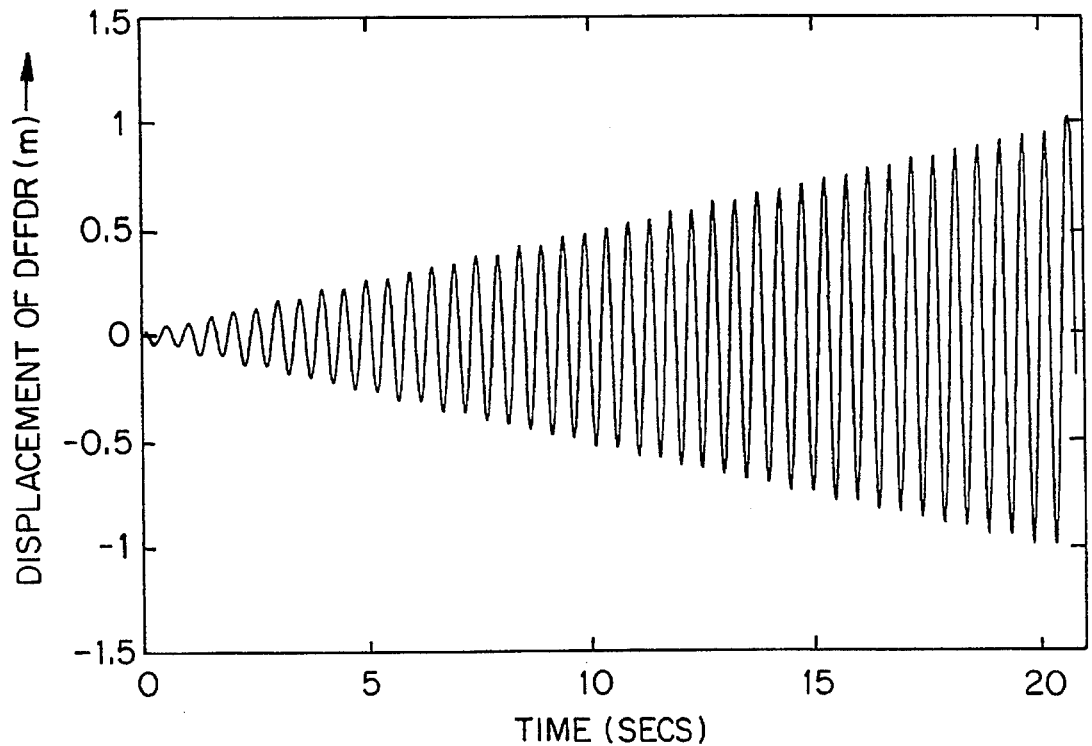
FIG. 9b THE RESPONSE OF THE DFFDR (OF FIG. 8A) TO SIN(12.7853τ)

RESPONSE OF THE PRIMARY WITH THE DFFDR (OF FIG. 8A)
TO SIN(5.7041$\tau$) SIN(12.7853$\tau$)

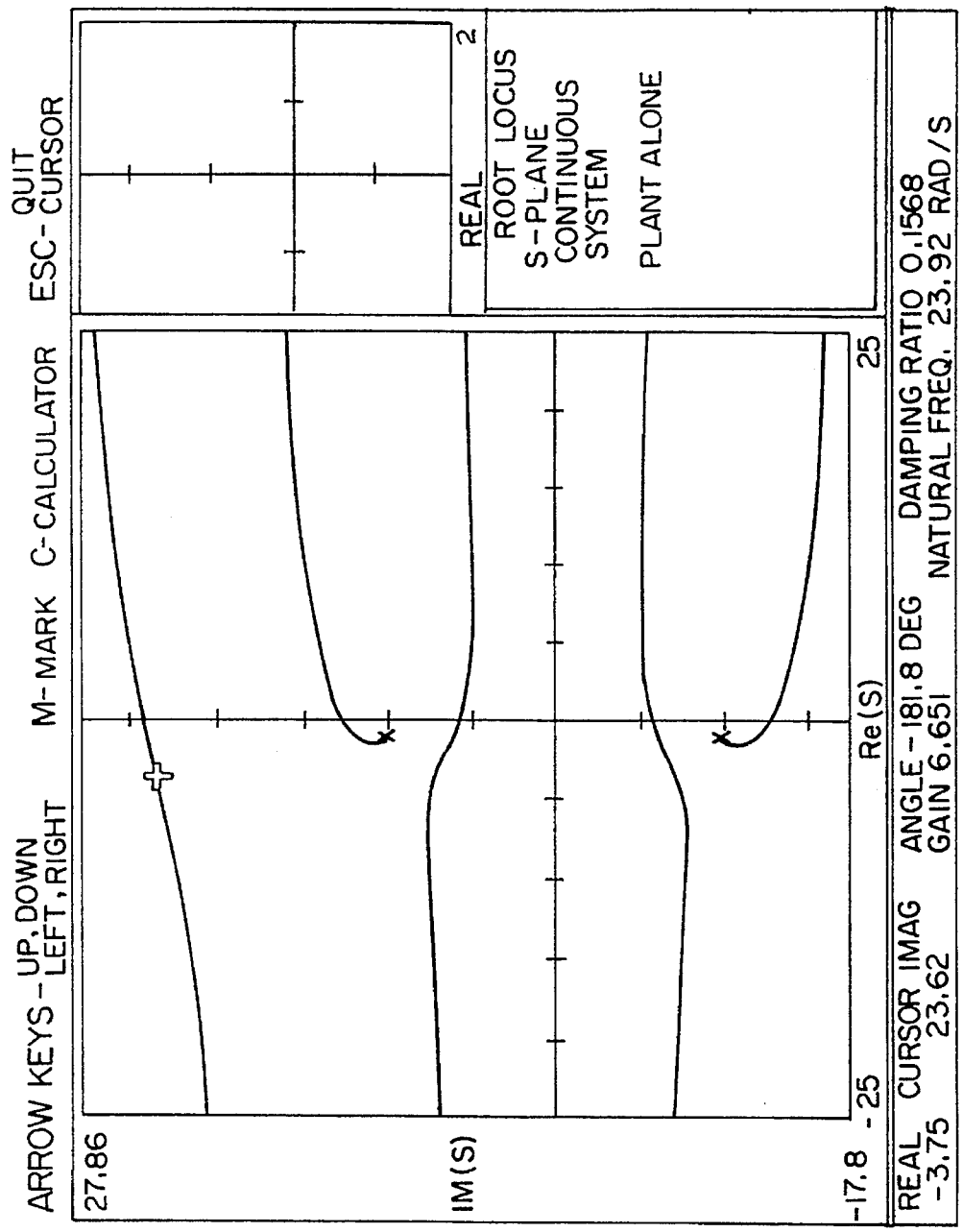
FIG. 11 THE COMBINED SYSTEM ROOT LOCUS REPRESENTATION

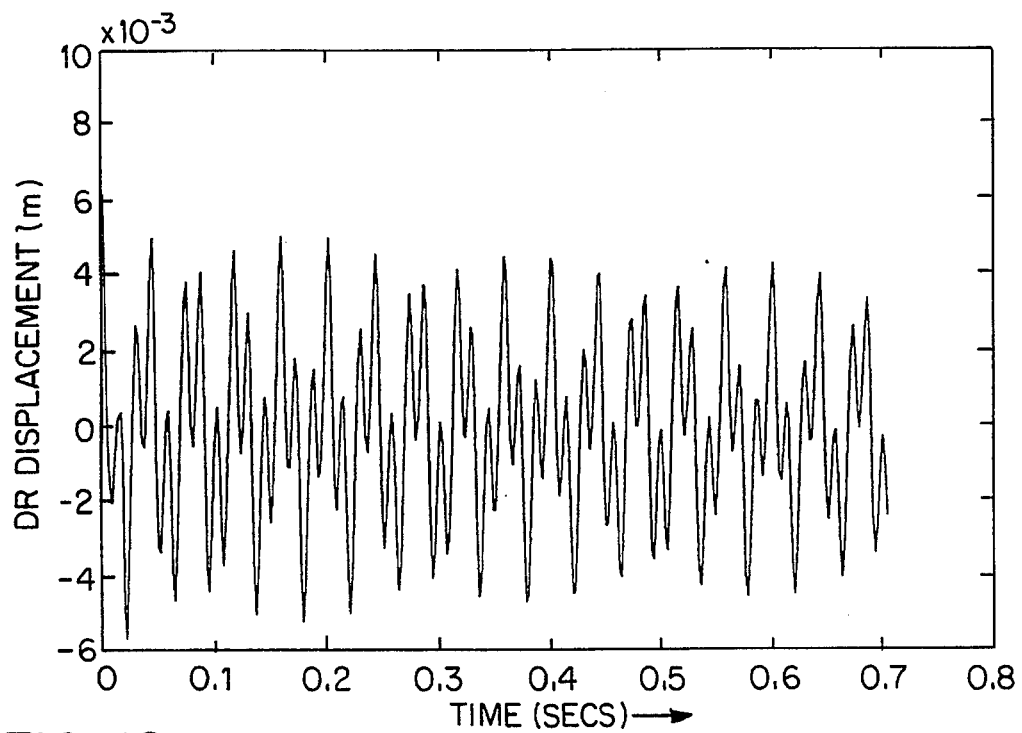
FIG. 12a IMPULSE RESPONSE OF THE DFFDR
($\omega_1 = 25$ Hz AND $\omega_2 = 70$ Hz)
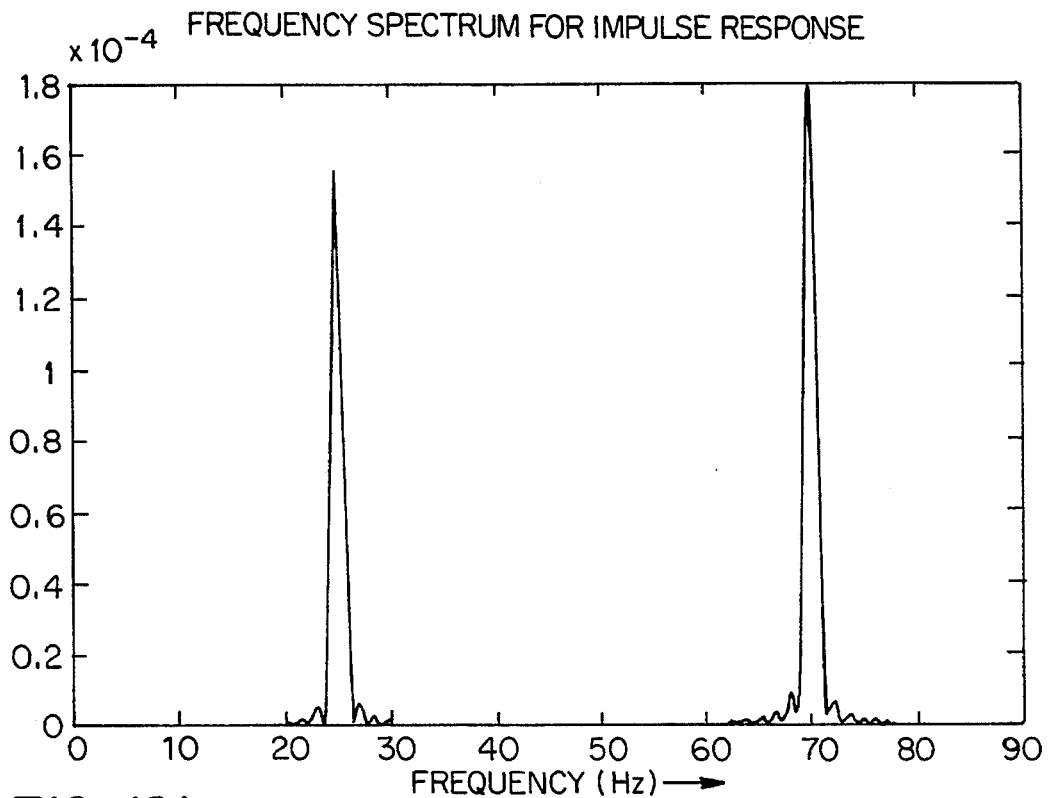
FIG. 12b FREQUENCY SPECTRUM OF THE RESPONSE IN FIG. 12A

SINGLE MASS DUAL FREQUENCY FIXED DELAYED RESONATOR

BACKGROUND OF THE INVENTION

The present invention relates to vibration damping of structures and, more particularly, to the damping of two different frequencies of vibration in a structure by use of a single mass-spring-damper.

In my United States Application, Ser. No. 08/241,755 filed May 12, 1994, now U.S. Pat. No. 5,431,261 granted Jul. 11, 1995. I have described in detail use of a dynamically controlled mass-spring-damper to damp a single frequency of excitation in a structure. This approach to reducing fatigue and failure in a monitored structure is highly beneficial.

However, most structures are subject to forces which cause them to vibrate at multiple frequencies, and generally two frequencies are of principal concern. Although the development of the patent application readily addresses the dominant frequency, the next most significant frequency of vibration may present a potential problem of only somewhat lesser magnitude.

BASIC PRINCIPLES

Engineering structures may be subject to loading conditions which result in displacements adversely affecting their desired performance. This is true with respect not only to static structures, but also moving structures such as motors, rotors and tools. The ensuing stresses due to these disturbances lead to fatigue and subsequent structural failure. As is generally agreed, the most detrimental form of loads are cyclical which cause a vibrational motion which may produce frequencies in the range of the natural frequency of vibration of the structure.

To reduce the deleterious effect of such vibrational motion, numerous methods have been proposed which may be generally grouped in two classes:

(a) Vibration Isolation. The structure is isolated from the input loads, i.e., the disturbances.

(b) Vibration Absorption. A modification of the structure is made which makes it non-responsive to the anticipated input disturbances. This mentioned modification may range from a simple alteration of certain structural parameters (e.g., stiffness or damping) to the coupling of a secondary structure to the primary one. This secondary structure is referred to as a vibration absorber. Its purpose is to absorb the energy input of the disturbances, thus reducing their effect on the primary structure.

Input disturbances are typically assumed to be harmonic forcing functions. The practicality of this selection results from the fact that any periodic disturbance may be analyzed as the sum of harmonic functions. Following this conventional analysis, the dynamic response of a structure is attenuated by use of a classical vibration absorber in the form of a mass-spring-damper as illustrated in FIG. 1. This absorber is attached to the primary structure imparting an additional degree of freedom. An absorber properly tuned to the vibrational frequency of the basic structure can highly attenuate the response of the primary system. A tuned absorber is defined as having values of $m_a$, $k_a$, and $c_a$ which yield maximum attenuation of oscillations of the primary structure, as described in many textbooks, e.g., Inman, D. J., *Vibration: with Control, Measurement and Stability*, 1989 Prentice-Hall, Englewood Cliffs, N.J. Obviously, the ideal absorption in response to harmonic forcing is achieved by introducing an equal and opposite force. An excited spring-mass at its natural frequency, i.e., in resonance, could achieve this objective.

The tuned passive absorber is most effective to remove the undesired oscillations of the primary structure in a narrow and fixed interval of operating frequencies, mainly near the $M_{peak}$ of the absorber section and ideally with $c_a=0$ setting. As a well known drawback, the effect of the absorber rapidly deteriorates outside of this range. If the excitation source is of varying frequency, there must be an absorber tuned to these vibrations.

There have been numerous studies in the field of active and passive vibration absorption (or suppression). In essence, they propose a structural alteration to the primary system to interfere with the behavior of the primary body passively or to subdue actively its vibratory response. All of these techniques are quite effective in their objectives. Briefly, the modified dynamic mechanisms absorb the energy input of the excitation source of the structure at a single frequency.

For a single frequency absorber, it has been generally considered that it should be equally effective for a large band of operating frequencies, i.e., it should be tunable without sacrificing the quality of performance. To indicate the practical applications of this "frequency tuning" feature, machine tool vibrations (at the tool-workpiece interface), aircraft fuselage parts, submersible hulls, and lively civic structures are subject to variations in vibrational frequency. Because of the excitation frequency variations imposed on these systems, the absorption must be frequency tuned dynamically to the most dominant frequency at any given time to be effective, and computerized active control methods have been proposed. A recent development in this field is the concept of "Delayed Resonators" (DR) which utilizes position feedback with a controlled time delay in a tunable mass-spring-damper trio as described in Olgac, N., McFarland, D. M., Holm-Hansen, B., *Position Feedback-Induced Resonance: The Delayed Resonator*, DSC— Volume 38, Active Control of Noise and Vibration, ASME-WAM 1992.

The structure shown in FIG. 2 represents a single degree of freedom (SDOF) absorber with an additional feedback force $gx_a(t-\tau)$, where g is a feedback gain and $\tau$ is a time delay applied to the displacement $x_a$. Control strategies involving time delay have been considered extensively in the literature, and almost all of them treat time delay as an undesirable property of the dynamics.

The Delayed Feedback Vibration Absorber

In my above identified copending application, there is described a novel method for dynamically damping vibrations of a structure under various applied loads by use of controlled time delay in the feedback controlling a damping member to effect such damping by delayed resonation of the damping member. This delayed resonator vibration absorber is illustrated in FIG. 3. As a result, the oscillations of the primary structure resulting from a single harmonic frequency may be damped by an absorber which is dynamically matched to that frequency.

However, as previously indicated, structures are exposed to multiple frequencies of excitation, two or more of which may usually be dominant. Although theoretically conceivable, it would not be practical to couple to the structure two or more delayed resonators operating at different frequencies to counteract these effects.

It is an object of the present invention to provide a novel single mass delayed resonator vibration absorber operating at two frequencies.

It is also an object to provide a method for damping vibrations of two frequencies in a structure by use of such a delayed resonator absorber which is actuated by a single and very simple control output signal.

Another object is to provide such a delayed resonator which is relatively simple to fabricate and operate.

SUMMARY OF THE INVENTION

It has now been found that the foregoing and related objects may be readily attained in a method for damping vibrations in a structure having a large mass and a multiplicity of frequencies of excitation, which first determines two principal frequencies of excitation for the structure of relatively large mass. There is coupled to this structure a damping member of smaller mass to provide an absorber, and the spring damper characteristics of this absorber are determined at these frequencies. The displacement of the damping member is continuously monitored, and the monitored displacement of the damping member is processed together with the spring damper characteristics of the absorber.

A signal is outputted to produce a force acting on the damping member which is proportional to the displacement of the damping member and a controlled time delay is superposed to produce two frequencies of vibration in the damping member which are substantially equal to the determined frequencies of excitation of the large structure. This produces resonance of the damping member substantially at these determined frequencies of excitation, and the resonance is effective to damp substantially the vibrations of the large structure at the determined frequencies of excitation. The output signal is variable dynamically to produce a force acting on the damping member with a controlled delay and which is proportional to varying monitored displacement of the damping member.

In one embodiment, the step of producing vibration in the damping member is effected by energizing vibrating means to produce the determined frequencies. This usually comprises providing an excitation signal to an actuator to oscillate the actuator and thereby the damping member at the determined frequencies. The vibrating means may be a mechanical vibrator to vibrate the damping member at the determined frequencies. The processing step produces an output signal to the damping member which corresponds to $$gx_a(t-\tau)$$

wherein $x_a$ is the monitored displacement of the damping member and the feedback delay ($\tau$) and gain (g) are determined as follows:

$$\frac{\sin(\tau\omega_1)}{\sin(\tau\omega_3)} = \frac{\omega_1}{\omega_3} \qquad \text{(i)}$$

$$\omega_{na}^2 = \frac{\omega_1^2 - \omega_3^2 cc}{1 - cc} = \frac{k_a}{m_a} \qquad \text{(ii)}$$

$$\text{where } cc = \frac{\cos(\tau\omega_1)}{\cos(\tau\omega_3)}$$

$$g = \frac{\omega_1^2 - \omega_{na}^2}{\cos(\tau\omega_1)} \qquad \text{(iii)}$$

$$\zeta_a = \frac{g \sin(\tau\omega_1)}{2 m_a \omega_{na} \omega_1} = \frac{c_a}{2\sqrt{k_a m_a}} \qquad \text{(iv)}$$

wherein $\omega_1$ and $\omega^3$ = the determined frequencies of the structure $\omega_{na}$ = natural frequency of vibration of the absorber = $\sqrt{\frac{k_a}{m_a}}$ $m_a$ = mass of the damping member and $c_a$ = damping coefficient of the absorber member $\zeta_a$ = damping ratio of the absorber = $\frac{c_a}{2\sqrt{k_a m_a}}$ and wherein $$\frac{\sin(\tau\omega_1)}{\sin(\tau\omega_3)} = \frac{\omega_1}{\omega_3}$$

gives multiple solutions for $\tau$ and there is selected the smallest value for T which gives positive values for each of $m_a$, $k_a$, and $c_a$.

The delayed resonance damping assembly for coupling to a structure subject to vibration comprises a support adapted to be moved on the structure, a damping member having known mass, stiffness and damping characteristics which is oscillatable on the support, and means for effecting vibration of the damping member to oscillate it on the support at two determined frequencies to provide an absorber. The assembly also includes means for monitoring the displacement of the damping member during its oscillation, and delayed feedback control means for processing the monitored displacement together with the spring damper characteristics of said absorber. The control means generates a signal acting on the damping member vibration means which is proportional to the displacement of the damping member, and provides a controlled time delay to produce the two determined frequencies of vibration in the damping member, this results in resonance of the damping member substantially at the determined frequencies, and is effective to damp substantially the vibrations of the associated structure at these frequencies. The output signal is variable to produce a force acting on the damping member with a controlled delay and which is proportional to the displacement of the damping member.

BRIEF DESCRIPTION OF THE DRAWINGS

FIG. 7a is a signal analyzer trace of a dual frequency delayed resonator experiment embodying the present invention showing the natural response to an impulse disturbance;

FIG. 7b is the frequency spectrum of the experimental response shown in FIG. 7a;

FIG. 8a is the computer simulated impulse response of the same dual frequency delayed resonator as in FIG. 7 embodying the present invention to a pulse having an initial amplitude of 0.01 meter;

FIG. 8b is the frequency spectrum of the response shown in FIG. 8a;

FIG. 9a is the response of the delayed resonator of FIG. 8a a to sin (5.7041 τ);

FIG. 9b is the response of the delayed resonator of FIG. 8a a to sin (12.7853 τ);

FIG. 10 is the response to the dual frequencies of FIGS. 9a and 9b of a primary structure having specified characteristics and combined with the delayed resonator of FIG. 8a;

FIG. 11 is a graphic presentation of the combined system root locus representation to establish safe and stable behavior of the selected characteristics of the combined system;

FIG. 12a is the computer simulated impulse response of the delayed resonator to frequencies of $\omega_1$ at 25 Hz and $\omega_2$ at 70 Hz; and FIG. 12 b is the frequency spectrum of the response shown in FIG. 12a.

DETAILED DESCRIPTION OF THE PREFERRED EMBODIMENT

The present invention is based upon the application of a proportional feedback of excitation based upon the position or displacement of the damping member in response to excitation based upon two frequencies of vibration induced in the primary structure. The dynamically monitored data of displacement is processed in a computer together with data concerning the two predetermined frequencies, and the mass, stiffness and damping characteristics of the damping member, in accordance with the principles described hereinafter to produce the vibrational force acting on the damping member. This applied force is proportional to the displacement of the damping member and is applied with a controlled time delay so as to produce two frequencies of vibration of the damping member which is substantially equal to the predetermined frequencies of vibration of the basic structural member. This results in resonance of the damping member at the two frequencies of excitation of the primary structure.

The intuitive rationale behind inducing such resonance frequencies is straightforward. The delayed resonator may be considered as a substructure of a larger system which is harmonically excited. If the frequencies of excitation are equal to the frequencies of the delayed resonator (DR), then the latter resonates with a 180 degree phase shift with respect to the excitation frequencies and absorbs all of the energy which is introduced to the system.

As a result of the dynamically controlled delayed feedback and resulting resonance, the damping member will effectively damp the vibrations in the primary structure.

Figure 4:
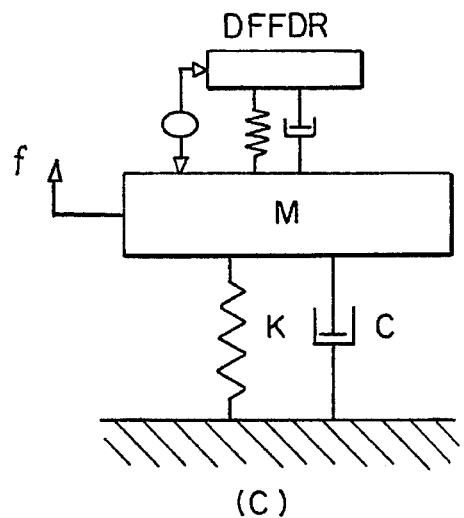
FIG. 4 is a diagrammatic illustration of a dual frequency fixed delayed resonator embodying the present invention.

A Dual Frequency Fixed Delayed Resonator (DFFR) embodying the present invention is schematically illustrated in FIG. 4. The protected structure of large mass is indicated by the letter m, and the DFFDR is so designated. As will be described hereinafter in detail, the displacement of the small damping member of the DFFDR is monitored, and vibrational force is applied thereto so as to cause it to resonate at two frequencies concurrently.

The core principles of a delayed resonator (DR) are explained in several recent publications. The theory and operation of a single frequency delayed resonator functioning as a vibration absorber, as well as description and illustration of structures and applications, are described in detail in the aforementioned copending application, Ser. No. 08/241,755 filed May 12, 1994. The theory and operation are also described in detail in Olgac, N. and Holm-Hansen, B., "A New Direction In Active Vibration Absorption: Delayed Resonator", DSC—Vol 50, Symposium On Mechatronics, ASME 1993, pp. 15–20. These detailed descriptions are incorporated herein by reference to avoid unnecessary replication.

As previously indicated, in order to generate a single frequency delayed resonator (DR) using a conventional mass-spring-damper trio, a corrective position feedback is implemented:

$$gx_a(t-\tau) \tag{1}$$

which imposes dynamics to this single degree of freedom (SDOF) system governed by:

$$m_a\ddot{x}_a + c_a\dot{x}_a + k_a x_a + g x_a(t-\tau) = 0 \tag{2}$$

It is important to note that the control in (1) is of a simple delayed position feedback type. Therefore, it causes no complications like complex, higher order numerically demanding control actuation.

Having recognized the desirability of damping excitation forces at two frequencies in the protected structure, it can be assumed that the excitation force is a combination of two simple harmonic forces:

$$f(t) = f_1 \sin \omega_1 t + f_2 \sin \omega_2 t \tag{3}$$

with the two distinct frequencies $\omega_1$ and $\omega_2$.

Figure 2:
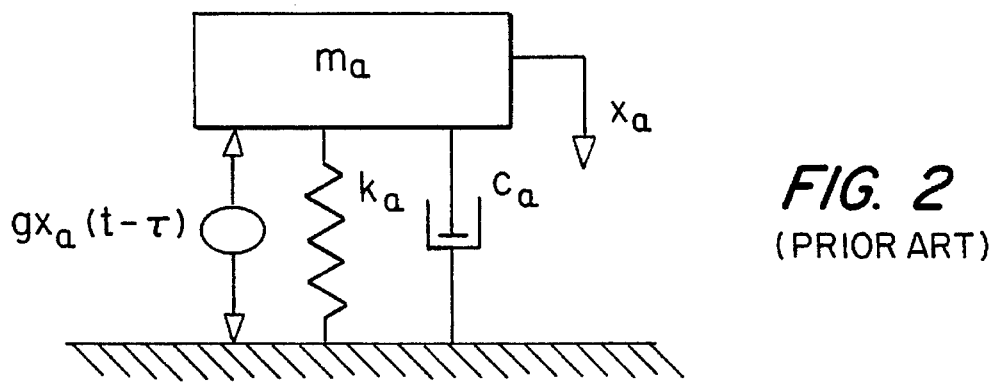
FIG. 2 is a diagrammatic illustration of a mass-spring-damper trio modified to function as a delayed resonator.
Figure 3:
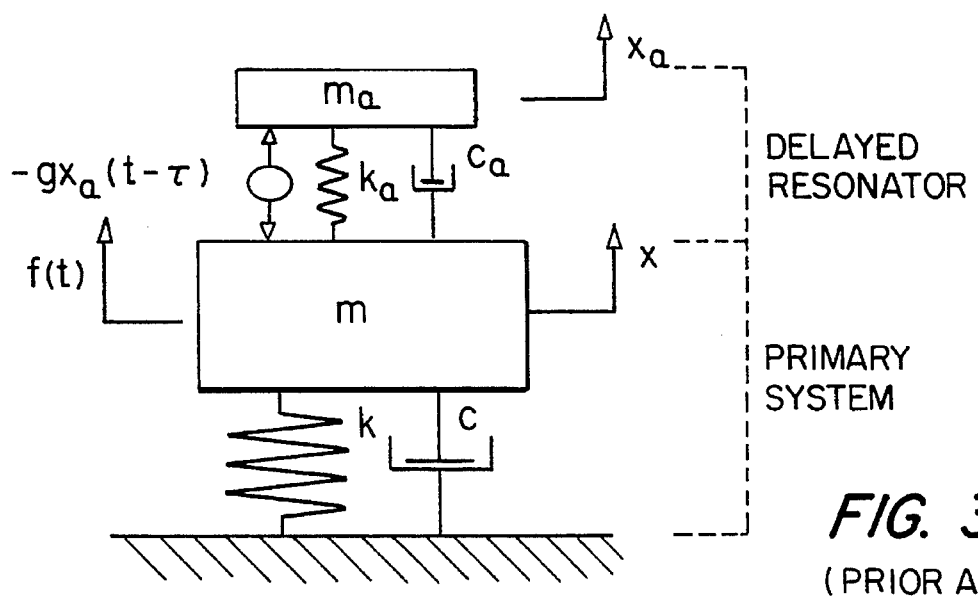
FIG. 3 is a diagrammatic illustration of a delayed resonator functioning as a vibration absorber.

When the predominant frequencies $\omega_1$ and $\omega_2$ may be determined for some industrial applications, then vibration absorption can be effected by a Dual Frequency Fixed Delayed Resonator (DFFDR) in accordance with the present invention. This device is nothing other than the DR shown in FIG. 2, but its feedback gain g and time delay τ are selected so that the single mass (i.e., SDOF) structure demonstrates two resonant frequencies concurrently. It acts like a couple of two fixed frequency (i.e., $\omega_1$ and $\omega_2$) delayed resonators. Therefore, its absorption effect would be identical to that obtained by mounting two separate delayed resonators on the structure.

This proposition appears to violate the "SDOF system/ single natural frequency or single resonance frequency" paradigm, especially if one considers that the feedback which causes the dual resonance behavior is of proportional position feedback type only. However, it should be noted that the characteristic equation of the DFFDR alone in FIG. 4 is $$CE(s) = ms^2 + cs + ks + ge^{-\tau s} = 0 \tag{4}$$

and it has infinitely many finite characteristic roots. For a single frequency DR, one pair of these roots is placed at $\pm\omega_c i$ by properly selecting g and τ. There is one particular pair of g and τ for which the CE(s) of (4) has two pairs of roots on the imaginary axis, thus providing a Dual Frequency Delayed Resonator (DFDR). For a given absorber component ($m_a, k_a$ and $c_a$), these two frequencies as well as the corresponding g and τ may be fixed, thus providing a Dual Frequency Fixed Delayed Resonator (DFFDR).

Given an $m_a$, $k_a$ and $c_a$ for an absorber, there are two inherently fixed resonant frequencies ($\omega_{01}$ and $\omega_3$) which can be achieved by a simple delayed position feedback $gx_a(t-\tau)$. However, it is necessary to find the feedback gain $g$ and the feedback delay $\tau$.

Figure 5:
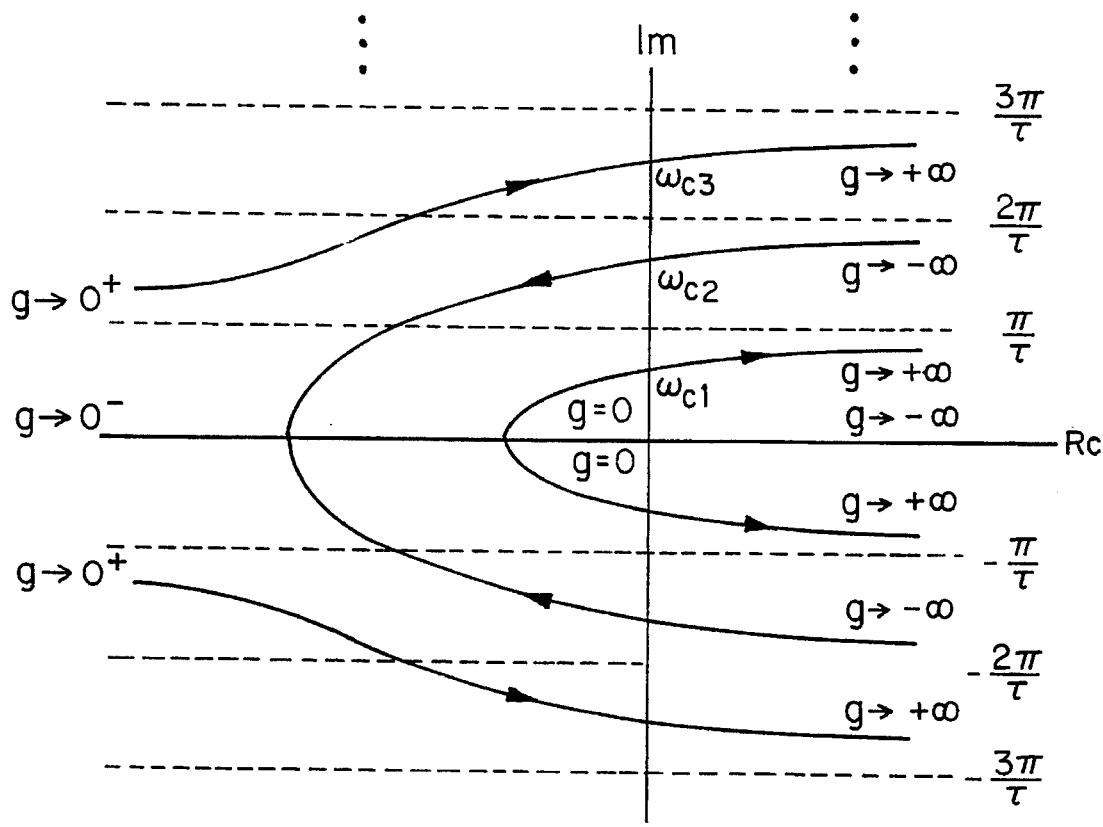
FIG. 5 is a graphic representation of a root locus of a delayed resonator with varying gain and constant delay.
Figure 6:
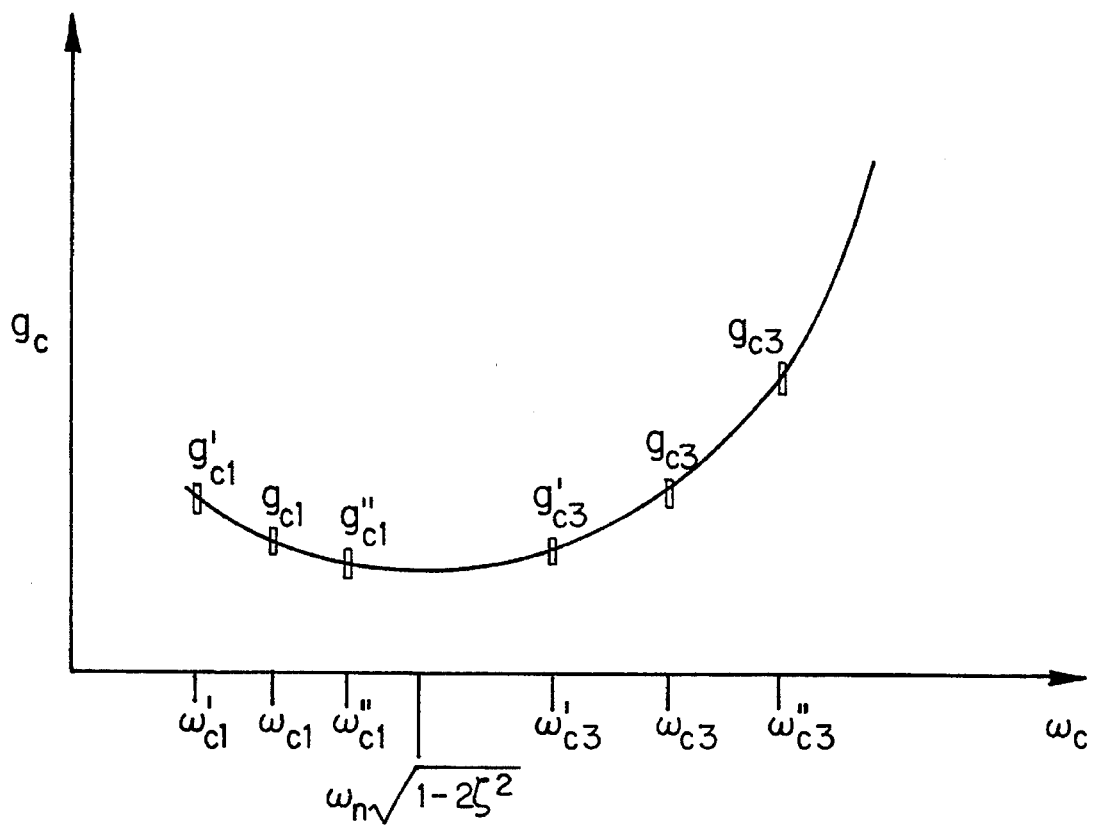
FIG. 6 is a graphic representation of gain variation with the crossing frequency.

Typically the root locus plot of the characteristic equation (4) has an outlook as FIG. 5 for varying $g$ and fixed $\tau$. As $g$ varies from 0 to $\infty$, the infinitely many roots move along their loci from the left of the plot to the right. For a particular $\tau$, the crossing gains of the first and third branches, $g_c(\omega_{c1})$ and $g_c(\omega_{c3})$, may be different from each other. As $\tau$ increases, the horizontal asymptotes become more dense, and $\omega_{c1}$ and $\omega_{c3}$ become smaller. On the other hand, the $g$ expression in (4) is quadratic and positive. Therefore it exhibits a minimum for a particular $\omega_c$ value (see FIG. 5). It is easy to show that $$\omega_{c\,min} = \omega_{na} \sqrt{1-2\zeta^2}$$

where $$\omega_{na} = \sqrt{\frac{k_a}{m_a}}$$

is the absorber natural frequency and $$\zeta_a = \frac{c_a}{2\sqrt{k_a m_a}}$$

is the absorber damping ratio.

To design a DFFDR for a desired pair of resonance frequencies, $\omega 1$ and $\omega 3$, it is clear that, for dual resonance, the characteristic equation (4) should possess two pairs of imaginary roots i.e., $s_{1,2}=\pm\omega_1 i$, $s_{3,4}=\pm\omega_3 i$, or $$(k_a-m_a\omega_1^2)+c_a\omega_1 i+ge^{-\tau\omega_1 i}=0 \quad (6)$$

$$(k_a-m_a\omega_3^2)+c_a\omega_3 i+ge^{-\tau\omega_3 i}=0$$

Equation (6) forms four real transcendental equations to solve for five unknowns $m_a$, $k_a$, $c_a$, $g$ and $\tau$, five unknowns. The fifth unknown is a tool for the designer to utilize. However, $m_a$ can be selected by considering the physical constraints of the particular structure. The other four unknowns are then numerically solved using 4 transcendental equations. From equation (6) one can reach the following set of equations.

$$\frac{\sin(\tau\omega_1)}{\sin(\tau\omega_3)} = \frac{\omega_1}{\omega_3} \quad (7a)$$

This solution provides $\tau$ $$\omega_{na}^2 = \frac{\omega_1^2 - \omega_3^2 cc}{1-cc} = \frac{k_a}{m_a} \quad (7b)$$

where $cc = \frac{\cos(\tau\omega_1)}{\cos(\tau\omega_3)}$

This solution provides $k_a$.

$$g = \frac{\omega_1^2 - \omega_{na}^2}{\cos(\tau\omega_1)} \quad (7c)$$

$$\zeta_a = \frac{g\sin(\tau\omega_1)}{2m_a\omega_{na}\omega_1} = \frac{c_a}{2\sqrt{k_a m_a}} \quad (7d)$$

This solution provides $c_a$.

Using the definitions of $\omega_a$ and $\zeta_a$, one can obtain the full description ($m_a$, $k_a$, $c_a$) of the absorber along with the control gain and delay ($g$ and $\tau$). It should be noted that equation (7a) yields multiple solutions for $\tau$. One should take the smallest $\tau$ solution which results in positive values for $m_a$, $k_a$, and $c_a$. As may be seen in FIG. 5, the smaller the $\tau$, the more spread the asymptotes of the root loci. Therefore, the crossings of the loci taking place at the specified $\omega_{c1}$ and $\omega_{c3}$ would be on the first and third branches instead of the fifth and seventh for instance. The higher the branch number, the higher the gain $g$ for the corresponding crossing. Thus, forcing the imaginary poles concurrently invites the unstable poles which have already crossed to the unstable right half plane on the lower numbered loci.

Figure 1:
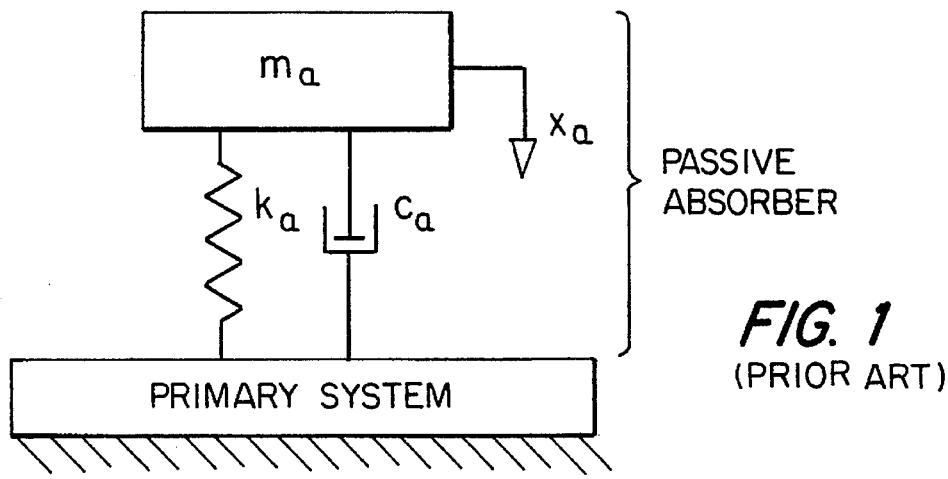
FIG. 1 is a diagrammatic illustration of a conventional mass-spring-damper trio functioning as a passive vibration absorber.

To evaluate the principle, an experimental unit of the type illustrated in FIG. 1 has the following characteristics:

$m_a$=0.7756 kg $k_a$=1280 N/m $c_a$=12.9257 kg/sec

The inherent dual resonant frequencies of the resonator are calculated as:

$\omega_{c1}$=11.719 Hz $\omega_{c3}$=25.391 Hz provided that the feedback is formed by $g$=7932.7 N/m and $\tau$=0.0410 sec. The natural response of the natural DFFDR is shown in FIG. 7 after an initial impulse disturbance is applied. FFT spectrum of this response in FIG. 7 clearly depicts that a DFFDR is effected with inherently built-in dual resonant frequencies for this set of $m_a$, $k_a$, $c_a$ absorber parameters.

If the DFFDR is a resonator for two distinct frequencies, it will show a linear increase in the oscillation amplitudes when excited harmonically either of these frequencies. In order to demonstrate this effect, it is assumed that $m_a$=0.1 Kg, $c_a$=0.2 Kg/sec, $k_a$10N/m. A DFFDR is generated by using a feedback in the form of $$g\chi_a(t-\tau)=6.8421\, x_a(t-0.5214) \quad (7)$$

to impart $\omega_1$=5.7041 rad/sec and $\omega_2$=12.7853 rad/sec. The simulations of the dynamic behavior were all done on MATLAB platform. FIG. 8a simulates DFFDR response to an impulse disturbance, of which the FFT spectrum is shown in FIG. 8b. It is very clear that two distinct frequencies of $\omega_1$ and $\omega_2$ are exhibited, and verifies the DFFDR methodology.

FIG. 9a simulates the response of this DFFDR to an excitation of $\sin(5.7041\tau)$. The linear increase in amplitude in time is a typical indication that the system is a perfect resonator at 5.7041 rad/sec. Similar observations are valid for 12.7853 rad/sec as shown in FIG. 9b. These two figures indicate that the DFFDR will act like a dual absorber for the forcing excitation on the primary structure:

$$f=f_o(\sin\omega_1\tau+\sin\omega_2\tau), \text{ where } f_o=50 \text{ is taken}$$

Figure 10:
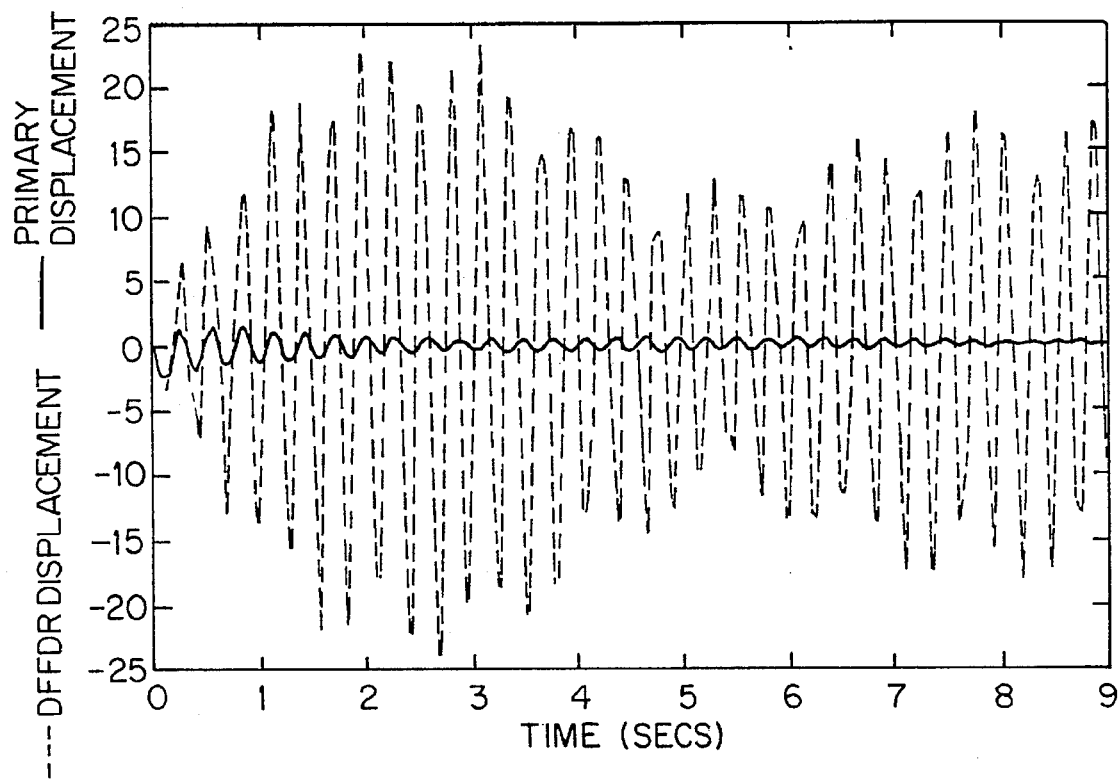

This absorber (DFFDR) is utilized with a primary structure characterized by M=0.2, C=5 and K=10 in appropriate units. The primary and absorber responses are shown in FIG. 10 relative to such a dual harmonic excitation. It is clear that DFFDR suppresses the undesired vibration at these frequencies concurrently.

An important point in this vibration absorption operation is the need to maintain the asymptotic stability for the combined system (i.e., the primary structure and the absorber). For this purpose, it is necessary to study the characteristic equation of the combined structure:

$$G(s)=(m_a s^2+c_a s+k_a)P(s)+m_a s^2(c_a s+k_a)+ge^{-\tau s}P(s) \quad (8)$$

$$P(s) = ms^2 + cs + k$$

CODAS (Golten and Verwer) Control System Design software is utilized to determine the root locus of the combined system. FIG. 11 shows the two primary crossings and the third branch, which carries a stable pole for g=6.981, which is bigger than the 6.8421 crossing gain for the DFFDR. This indicates that all of the infinitely many roots of the C E(s) are in the stable left-half plane. Therefore, the combined system with DFFDR is asymptotically stable. This is an important finding because, if and when the DFFDR itself is slightly unstable, the combined system maintains its asymptotically stable behavior. When undisturbed or jolted by a transient external force, the combined structure should return to its equilibrium configuration.

Thus, although the designer may empirically select a mass and characteristics for the damping member, the likely stability of the combined system should be verified by the procedure described above.

To prove the effect of the present invention, a DFFDR is designed with a pair of designated resonance frequencies: $\omega_1$ and $\omega_3$. The set of equations which should be satisfied and the procedure to be followed were discussed above, and forcing frequencies of $\omega^1 = 25$ Hz and $\omega_3 = 70$ Hz are selected. A program written in MATLAB platform executes the procedure defined above and results in $\omega_{na} = 67.6395$ Hz $\zeta_a = 0.4451$ $g = 667530$ N/m $\tau = 0.0177$ sec If $m_a = 4$ Kg is selected as the mass of the absorber, the remaining components are easily determined as:

$c_a = 1513.2$ Kg/sec $k_a = 722470$ N/m

In order to verify these numerical findings, a simulation program is executed. The DFFDR alone is disturbed by an impulse force and the natural behavior is observed. FIG. 12a shows the time history of this motion. FIG. 12b is the FFT spectrum distribution of this behavior and it confirms the original design objective—$\omega_1$ and $\omega_3$ dual frequency resonance.

The delayed resonator assembly includes a support such as a rigid plate which can be bolted or otherwise affixed to the structure which is to be damped. This support should include guides for oscillation of the damping member relative thereto, such as posts which conveniently extend through apertures in the damping member. In this manner, the damping member will oscillate in an essentially parallel direction to the oscillations in the mounting plate and to the oscillations in the underlying structure which are to be eliminated.

The Delayed Resonator may be readily applied to buildings, bridges and other fixed structures as well as to moving and rotating machinery. In large structures such as bridges and buildings, it will be appreciated that multiple DFFDR modules may be spaced thereabout to damp vibrations at least in key areas to minimize fatigue, and to damp vibrations which may be of different frequencies in the different key areas.

As is well known, various devices may be employed to monitor the frequency of excitation of the applied load(s) in the structural member including force transducers and accelerometers. Similarly, various devices may be used to monitor the displacement of the damping member from a reference plane which can be at a point along the length of the guide posts in the illustrated embodiment. Such devices include a linear variable differential transducer (LVDT) and a optical measuring means such as an interferometer. The frequencies of excitation exhibits in the structure to be protected should be monitored under conditions of normal operation.

The vibrating force on the damping member may be effected over a fairly wide range of frequencies by actuators which are drivable at various frequencies and by mechanical vibrators of various types.

The computer or microprocessor stores data concerning the mass, stiffness and damping characteristics of the damping member, and the algorithms selected for the particular assembly as described hereinbefore. Inputs from the displacement monitor for the damping member are received and processed to output the signals to the vibrating element for the damping member.

The principles set forth herein to achieve an effective double frequency fixed delayed resonance (DFFDR) damper may be optimized for a given installation to minimize the mass of the damping member and the force required to effect its vibration. The equations set forth herein are readily introduced into algorithms for the computer control for the DR unit.

Thus, it can be seen from the foregoing detailed description and attached drawings that the dual frequency fixed delayed resonator of the present invention can simultaneously damp vibrations of two different frequency which are being forced upon the protected structure by applying loads. Using the principles set forth herein, and readily determined data concerning the two frequencies of greatest concern, a delayed resonator functioning as an absorber can be readily designed and fabricated. Moreover, the simplicity of the structure enables facile assembly and operation as well as relative long life.

Having thus described the invention, what is claimed is:

1. In a method for damping vibrations in a structure having a relatively large mass and subject to a multiplicity of frequencies of excitation, the steps comprising:

(a) determining the two frequencies of excitation of greatest magnitude for a structure of relatively large mass in which vibrations caused by said two frequencies are to be damped;

(b) coupling to said structure with a relatively large mass a damping member of smaller mass to provide an absorber;

(c) determining the spring damper characteristics for said absorber at said two determined frequencies of excitation;

(d) continuously monitoring the displacement of said damping member;

(e) processing said monitored displacement of said damping member together with said spring damper characteristics of said absorber; and (f) outputting a signal to produce a force acting on said damping member proportional to the monitored displacement of said damping member with a controlled time delay to produce two frequencies of vibration in said damping member substantially equal to said two determined frequencies of excitation of said structure of relatively large mass and thereby to produce resonance of said damping member substantially at said two determined frequencies of excitation, said resonance being effective to damp substantially the vibrations of said structure of relatively large mass at said two determined frequencies of excitation, said output signal being variable to produce a force acting on said damping member with a delay and which is proportional to said displacement of said damping member.

2. The method of damping vibrations in a structure in accordance with claim 1 wherein said step of outputting a signal effects the production of vibration in said damping member by energizing vibrating means to produce said two determined frequencies therein.

3. The method of damping vibrations in a structure in accordance with claim 2 wherein said step of energizing said vibrating means comprises providing an excitation signal to an actuator to oscillate said actuator and thereby said damping member at said two determined frequencies.

4. The method of damping vibrations in a structure in accordance with claim 2 wherein said step of energizing said vibrating means comprises providing an excitation signal to a mechanical vibrator to vibrate said damping member at said two determined frequencies.

5. The method of damping vibrations in a structure in accordance with claim 1 wherein the processing step utilizes the following formula to obtain the feedback signal:

$$gx_a(t-\tau)$$

wherein $x_a$ is the monitored displacement of said damping member, $\tau$ is the feedback delay and g is the gain.

6. In a method for damping vibrations in a structure having a relatively large mass and subject to a multiplicity of frequencies of excitation, the steps comprising:

(a) determining the two frequencies of excitation of greatest magnitude for a structure of relatively large mass in which vibrations caused by said two frequencies are to be damped;

(b) coupling to said structure with a relatively large mass a damping member of smaller mass to provide an absorber;

c) determining the spring damper characteristics for said absorber at said two determined frequencies of excitation;

(d) continuously monitoring the displacement of said damping member;

(e) processing said monitored displacement of said damping member together with said spring damper characteristics of said absorber; and (f) outputting a signal to produce a force acting on said damping member proportional to the monitored displacement of said damping member with a controlled time delay to produce two frequencies of vibration in said damping member substantially equal to said two determined frequencies of excitation of said structure of relatively large mass and thereby to produce resonance of said damping member substantially at said two determined frequencies of excitation, said resonance being effective to damp substantially the vibrations of said structure of relatively large mass at said two determined frequencies of excitation, said output signal being variable to produce a force acting on said damping member with a delay and which is proportional to said displacement of said damping member, said processing step producing an output signal to said damping member which corresponds to $$gx_a(t-\tau)$$

wherein $x_a$ is the monitored displacement of said damping member and wherein the feedback delay ($\tau$) and gain (g) are determined as follows:

$$\frac{\sin(\tau\omega_1)}{\sin(\tau\omega_3)} = \frac{\omega_1}{\omega_3} \quad \text{(i)}$$

$$\omega_{na}^2 = \frac{\omega_1^2 - \omega_3^2 cc}{1-cc} = \frac{k_a}{m_a} \quad \text{(ii)}$$

where $cc = \frac{\cos(\tau\omega_1)}{\cos(\tau\omega_3)}$ $$g = \frac{\omega_1^2 - \omega_{na}^2}{\cos(\tau\omega_1)} \quad \text{(iii)}$$

$$\zeta_a = \frac{g \sin(\tau\omega_1)}{2m_a\omega_{na}\omega_1} = \frac{c_a}{2\sqrt{k_a m_a}} \quad \text{(iv)}$$

wherein $\omega_1$ and $\omega_3$ = said determined frequencies of said structure of relatively large mass $\omega_{na}$ = natural frequency of vibration of the absorber = $\sqrt{\frac{k_a}{m_a}}$ $m_a$ = mass of said damping member
and $c_a$ = damping coefficient of said absorber $\zeta_a$ = damping ratio of the absorber = $\frac{c_a}{2\sqrt{k_a m_a}}$ and wherein $$\frac{\sin(\tau\omega_1)}{\sin(\tau\omega_3)} = \frac{\omega_1}{\omega_3}$$

gives multiple solutions for $\tau$ and there is selected the smallest value for $\tau$ which gives positive values for each of $m_a$, $k_a$, and $c_a$.

7. A delayed resonance damping assembly for coupling to a structure subject to a multiplicity of frequencies of excitation producing vibration thereof comprising:

(a) a support adapted to be mounted on an associated structure in which vibrations are to be clamped;

(b) a damping member having known mass, stiffness and damping characteristics and oscillatable on said support;

(c) means for effecting vibration of said damping member to oscillate it on said support at two determined frequencies to provide an absorber;

(d) means for monitoring the displacement of said damping member during its oscillation;

(e) means for determining the two frequencies of excitation of the associated structure which are of the greatest magnitude; and (f) delayed feedback control means for processing the monitored displacement together with spring damper characteristics of said absorber, said control means generating a signal acting on said means for effecting vibration of said damping member, said signal being proportional to the displacement of said damping member, said control means providing a controlled time delay to produce said two frequencies of vibration in said damping member and thereby to produce resonance of said damping member substantially at said two determined frequencies, said resonance being effective to damp substantially the vibrations of the associated structure at said two determined frequencies, said output signal being variable to produce a force acting on said damping member with a delay and which is proportional to said displacement of said damping member.

8. The delayed resonance damping assembly in accordance with claim 7 wherein said vibration means is an actuator.

9. The delayed resonance damping assembly in accordance with claim 7 wherein said vibration means is a mechanical vibrator.

10. The delayed resonance damping assembly in accordance with claim 7 wherein said delayed feedback control means utilizes the following formula to obtain the feedback signal:

$$gx_a(t-\tau)$$

wherein $x_a$ is the monitored displacement of said damping member, $\tau$ is the feedback delay and $g$ is the gain.

11. A delayed resonance damping assembly for coupling to a structure subject to a multiplicity of frequencies of excitation producing vibration thereof comprising:

(a) a support adapted to be mounted on an associated structure in which vibrations are to be clamped;

(b) a damping member having known mass, stiffness and damping characteristics and oscillatable on said support;

(c) means for effecting vibration of said damping member to oscillate it on said support at two determined frequencies to provide an absorber;

(d) means for monitoring the displacement of said damping member during its oscillation;

(e) means for determining the two frequencies of excitation of the associated structure which are of the greatest magnitude; and (f) delayed feedback control means for processing the monitored displacement together with spring damper characteristics of said absorber, said control means generating a signal acting on said means for effecting vibration of said damping member, said signal being proportional to the displacement of said damping member, said control means providing a controlled time delay to produce said two frequencies of vibration in said damping member an thereby to produce resonance of said damping member substantially at said two determined frequencies, said resonance being effective to damp substantially the vibrations of the associated structure at said two determined frequencies, said output signal being variable to produce a force acting on said damping member with a delay and which is proportional to said displacement of said damping member, said delayed feedback control means producing an output signal to said damping member which corresponds to $$gx_a(t-\tau)$$

wherein $x_a$ is the monitored displacement of said damping member and wherein the feedback delay ($\tau$) and gain ($g$) are determined as follows:

$$\frac{\sin(\tau\omega_1)}{\sin(\tau\omega_3)} = \frac{\omega_1}{\omega_3} \quad \text{(i)}$$

$$\omega_{na}^2 = \frac{\omega_1^2 - \omega_3^2 cc}{1 - cc} = \frac{k_a}{m_a} \quad \text{(ii)}$$

$$\text{where } cc = \frac{\cos(\tau\omega_1)}{\cos(\tau\omega_3)}$$

$$g = \frac{\omega_1^2 - \omega_{na}^2}{\cos(\tau\omega_1)} \quad \text{(iii)}$$

$$\zeta_a = \frac{g\sin(\tau\omega_1)}{2m_a\omega_{na}\omega_1} = \frac{c_a}{2\sqrt{k_a m_a}} \quad \text{(iv)}$$

wherein $\omega_1$ and $\omega_3$ = said determined frequencies of said structure of relative large mass $$\omega_{na} = \text{natural frequency of vibration of the absorber} = \sqrt{\frac{k_a}{m_a}}$$

$m_a$ = mass of said damping member and $c_a$ = damping coefficient of said absorber $$\zeta_a = \text{damping ratio of the absorber} = \frac{c_a}{2\sqrt{k_a m_a}}$$

and wherein $$\frac{\sin(\tau\omega_1)}{\sin(\tau\omega_3)} = \frac{\omega_1}{\omega_3}$$

gives multiple solutions for $\tau$ and there is selected the smallest value for $\tau$ which gives positive values for each of $m_a$, $k_a$, and $c_a$.

\* \* \* \* \*